INVENTOR.
PLUMMER E. DOUBLE
BY
WILSON, SETTLE & CRAIG
ATTORNEYS

INVENTOR.
PLUMMER E. DOUBLE
BY
WILSON, SETTLE & CRAIG
ATTORNEYS

July 7, 1964    P. E. DOUBLE    3,140,010
METHOD OF AND APPARATUS FOR DISPENSING FASTENERS
Filed Dec. 5, 1961    4 Sheets-Sheet 4

INVENTOR.
PLUMMER E. DOUBLE
BY
WILSON, SETTLE & CRAIG
ATTORNEYS

United States Patent Office 3,140,010
Patented July 7, 1964

3,140,010
METHOD OF AND APPARATUS FOR
DISPENSING FASTENERS
Plummer E. Double, Detroit, Mich., assignor to
Multifastener Corporation, Redford, Mich.
Filed Dec. 5, 1961, Ser. No. 157,152
2 Claims. (Cl. 221—73)

The present invention relates to a method of and apparatus for dispensing pierce nuts or similar fasteners. More particularly, the present invention relates to a method of and apparatus for furnishing pierce nuts or similar fasteners to an installation location by adhesively affixing the fasteners to a continuous web, advancing the web to a stripping location and stripping the fasteners from the web.

In the installation of pierce nuts, clinch nuts, or similar types of multi-threaded fasteners it is necessary to accurately position the fastener in a predetermined orientation at the point of utilization. Usually, the nuts are not symmetric about the axis of the threaded opening and consequently must be oriented about this axis in order for utilization with the nut-deforming die or punch. The only way in which such orientation could be accomplished by following the prior art teachings was by utilization of a hopper from which nuts are fed into a metallic or plastic feed chute to their point of ultimate use. In an installation where a multitude of nuts are to be installed in a single press operation, several hoppers must be provided. The expense of the hoppers and of their installation, together with the requisite overhead space for hopper installation, may become quite burdensome, and further expenditures are required for the maintenance of the hoppers and the required chuting.

The present invention provides a new and novel approach to the dispensing of nuts or similar fasteners for installation at a press location. The basic concept of the present invention involves the adherence of the individual nuts in aligned sequence to an elongated web, preferably a pressure-sensitve adhesive applied to a plastic or fiber glass reinforced tape, wound helically on a reel. The reel of helically wound tape thus becomes the storage unit from which the nuts can be individually dispensed in proper orientation and in spaced sequence for travel through a relatively short length of chutting to the installation location.

The apparatus for accomplishing the feeding of the nut to the installation location thus includes an axle or shaft upon which the helically wound nut-tape reel is disposed, a restricted stripping chamber into which the adhesive web and the adherent nuts are fed and which communicates freely with the chuting, and a take-up reel upon which the adhesive web is wound. The nuts, being tightly confined in the stripping chamber, are fed directly into the chuting as the tape or web is stripped from the nuts, and the adherence of the nuts to the web during stripping provides the force for feeding nuts into the chute. The web is maintained under tension and preferably the entire apparatus is actuated by rotating the take-up reel through a predetermined rotation increment upon each actuation of the press. By incorporating a suitable escapement and anti-back lash mechanism, the nuts may be individually and forcibly fed into the chute for eventual utilization at the chute outlet.

It is, therefore, an important object of the present invention to provide a new and improved apparatus for and method of supplying fasteners to an installation location.

Another important object of this invention is the provision of an apparatus for delivering nuts to a chute from a reel of nuts adhered to a continuous fibrous web, the apparatus including a stripping zone tightly confining the nuts and the web and in which the web is removed from the nuts to force the nuts into a feed chute.

It is a further object of this invention to provide a method of feeding nuts into a delivery chute by removing the nuts and the adherent web from a reel under web tension, confining the nuts and the web in a stripping chamber communicating with a feed chute, and stripping the web from the nuts while utilizing the tensile forces exerted on the web to force the nuts into the chute.

Yet another, and no less important, object of the present invention is the provision of an apparatus for dispensing nuts stored in a helically wound reel and disposed in spaced array on a continuous web, the apparatus defining a stripping chamber in which the nuts are tightly confined while still adherent to the web and a take-up reel which is press-actuated to strip the web from the nuts and to force the nuts into an exit communicating with a feed chute.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
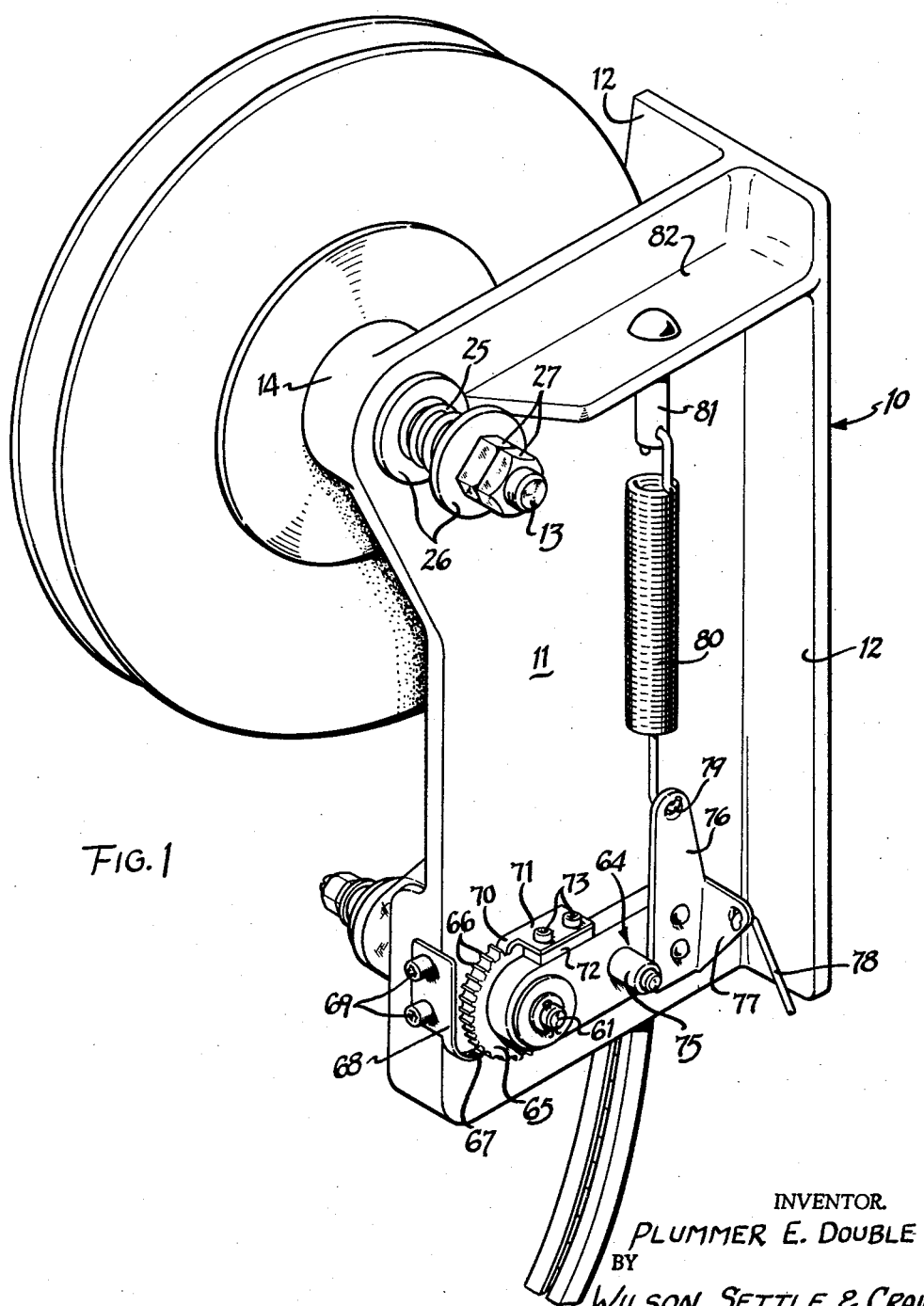
FIGURE 1 is an elevational perspective view of an apparatus capable of carrying out the method of the present invention.
Figure 2:
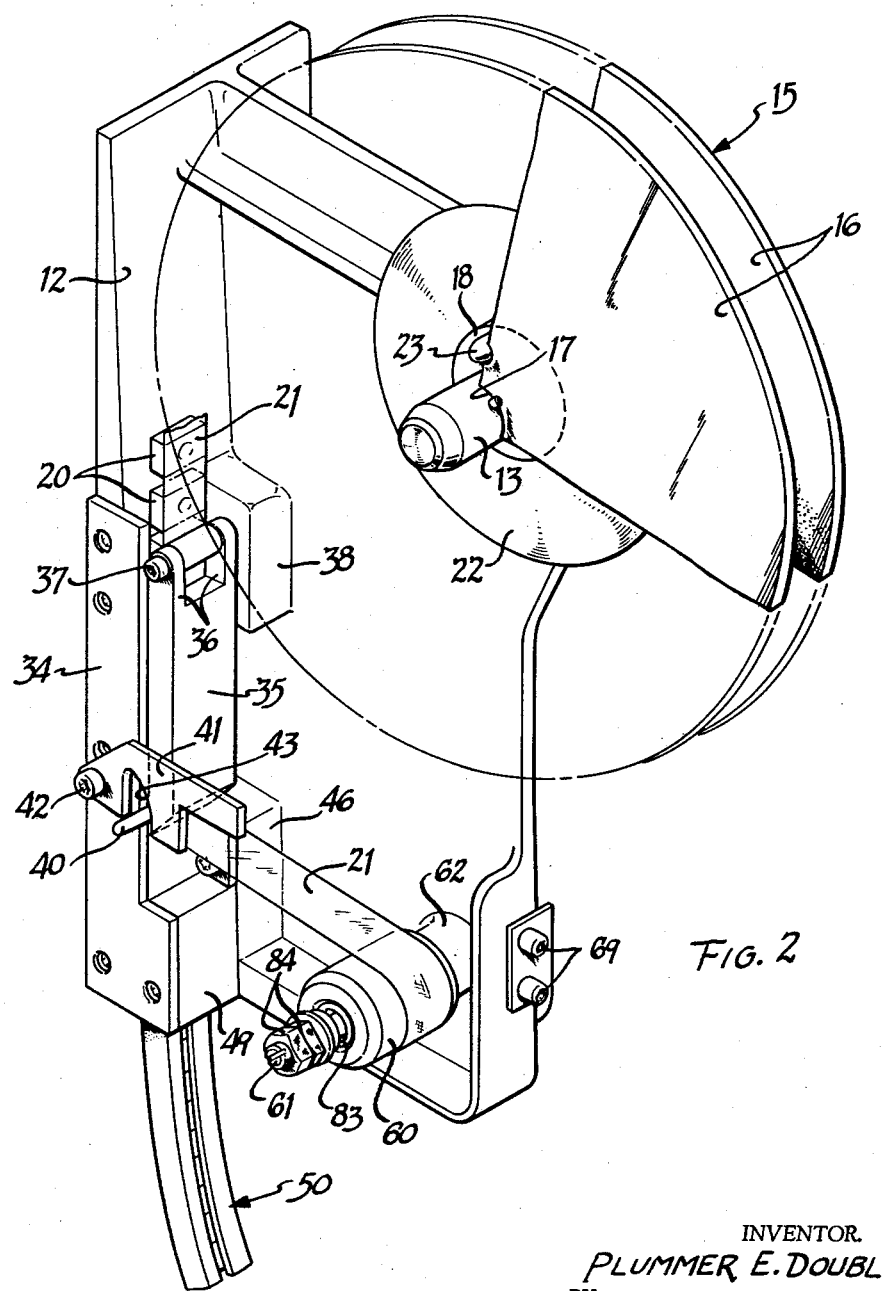
FIGURE 2 is also an elevational perspective view, with parts broken away, of the apparatus of FIGURE 1.

From FIGURES 1 and 2 of the drawings, it will be seen that the present invention includes a main frame unit 10 having a generally planar main structural member 11 secured to laterally projecting terminal flanges 12 oppositely projecting from one longitudinal extremity thereof.

The main frame element 11 is provided with a first shaft or axle 13 projecting through an integral embossment 14 and journaled therein for rotation. This shaft 13 projects freely to one side of the boss 14 to receive thereon a reel 15.

The reel 15 consists of a pair of circular side plates 16 centrally apertured, as at 17, to allow the shaft 13 to project freely therethrough and a cylindrical core 18 also apertured to receive the shaft. Disposed intermediate the plates 16 and helically wound therebetween about the core 18 are a plurality of fasteners 20, such as pierce nuts, adhesively secured to an adhesive web 21. The reel side plates 16 are placed on the shaft 13 in contact with a circular side plate 22 rotatable with the shaft 13 and carrying a locating stud 23 (FIGURE 2) projecting through the core 18 and the plates 16. Since the plate 22 and the stud 23 are co-rotatable with the shaft 13, co-rotation between the reel 15 and the shaft 13 is insured.

Free rotation of the shaft 13 and the reel 15 is prevented by the resistance coil compression spring 25 wrapped thereabout and confined between axially spaced plates 26. The compression of the spring 25 can be varied by a pair of nuts 27 disposed upon the threaded free end of the shaft 13.

Figure 3:
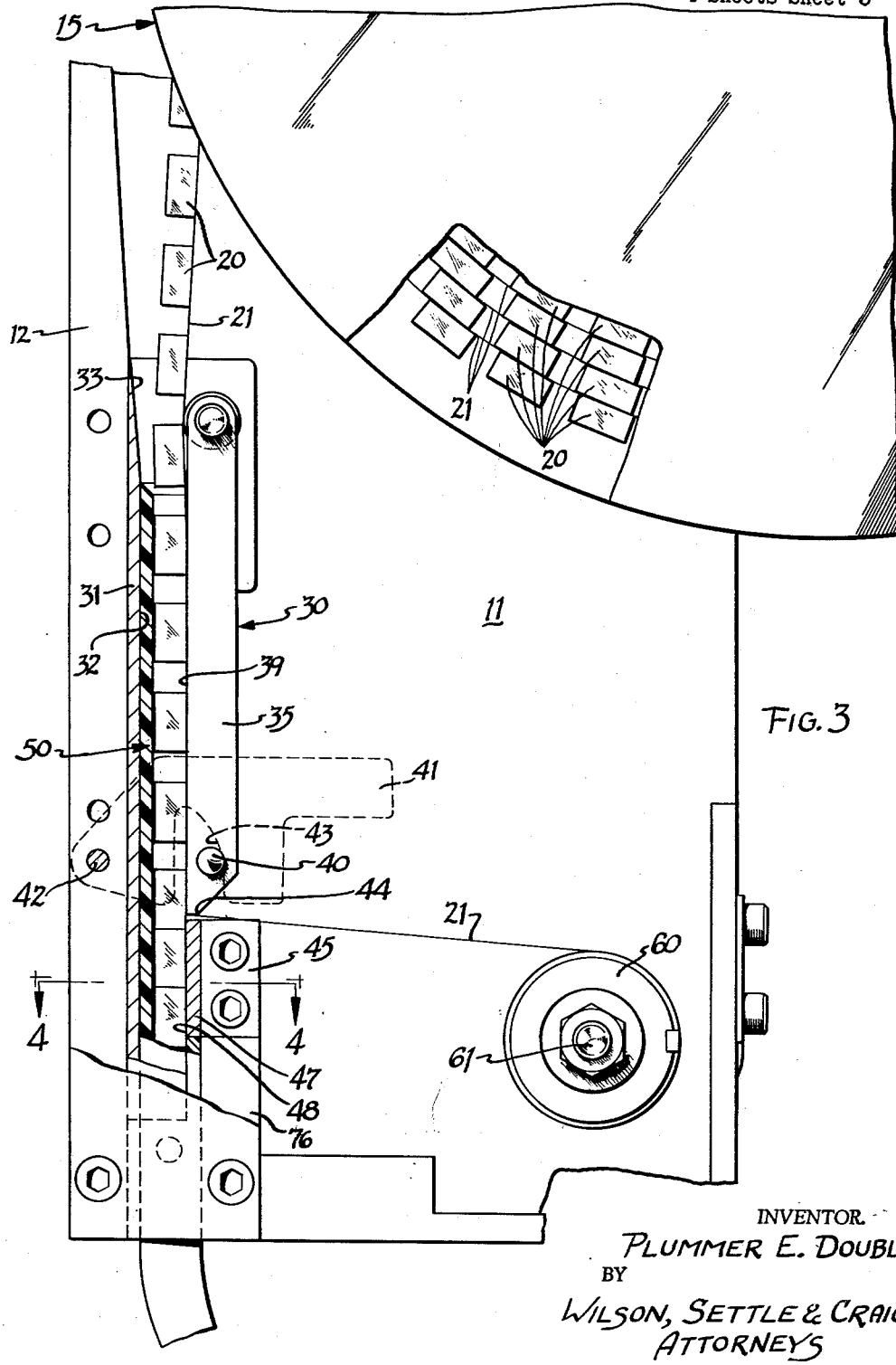
FIGURE 3 is a side elevational view, with parts broken away and in section, of the apparatus of FIGURES 1 and 2.
Figure 4:
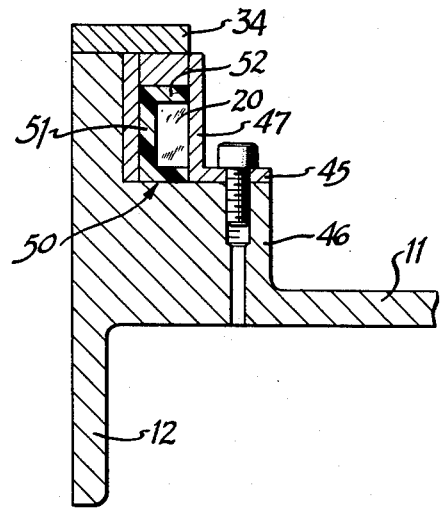
FIGURE 4 is a sectional view taken along the plane 4—4 of FIGURE 3.

As best shown in FIGURES 2, 3 and 4 of the drawings, the nuts 20 and the adherent web 21 are fed from the reel 15 into a restricted stripping chamber indicated generally at 30. This chamber is defined by one of the flanges 12 of the frame 10, this flange including a transverse wall 31 having a substantially vertical side surface 32 blending at its upper end through an inclined surface 33 into the flange proper. Secured to the flange is a side plate 34 of generally rectangular outline cooperating with an embossment 38 on the frame portion 11 and with the surfaces 32 and 33 to define three sides of an entry way into the rectangular stripping chamber. The entry way of the stripping chamber is closed by a pivotal cover plate 35. This cover plate 35 is provided at its upper extremity with bifurcated legs 36 journaled on a transverse pivot pin 37 carried by the embossment 38, which is located at the juncture of the flange 12 and the main frame plate 11. The cover plate 35 thus closes the stripping zone, the cover plate undersurface 39 being parallel to the flange surface 32.

The pivotal cover plate 35 is adapted to be latched into position by means of a transverse latch pin 40 carried by the cover plate and a pivotal latch 41 carried by the side plate 34 upon a pivot pin 42. The latch plate 41 is provided with an arcuate latching surface 43 engageable with the pin 40 when the latch plate is moved in a clockwise direction about the pivot pin 42. The lower extremity 44 of the cover plate 35 is closely spaced from a fixed L-shaped bracket 45 secured to an embossment 46 similar to the embossure 38 and carried at the lower extremity of the flange 12, the bracket 45 having a transversely projecting flange 47, the inner or undersurface 48 of which is co-planar with the surface 39 of the cover plate 35. The embossment 46 carries an additional fixed securing block 49 to which is secured the lower extremity of the side plate 34.

Figure 5:
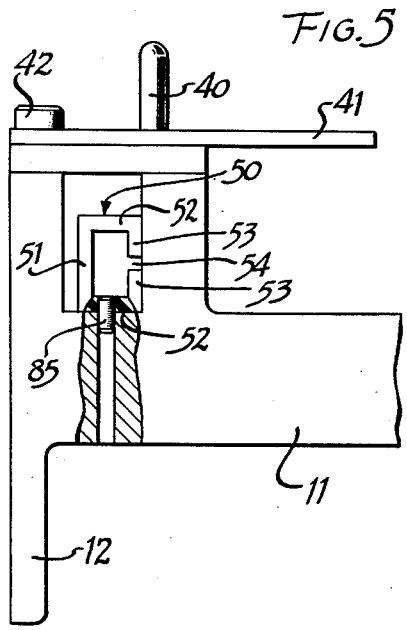
FIGURE 5 is an end elevational view of the apparatus, with parts broken away and in section.

Projecting into the stripping chamber entry way provided by the flange surface 32, the side plate 34, the undersurface 39 of the cover plate 35 and the side surface of the embossure 38 is the terminal end of a nut chute or guide 50. The nut chute 50 then projects downwardly beneath the cover plate 35 to bridge the gap between the embossures 38 and 46. As best illustrated in FIGURE 5 of the drawings, this nut chute or guide 50 generally defines a hollow rectangular shape including a planar base 51, side walls 52 projecting transversely therefrom, and inturned upper legs 53 integral with the side legs 52 and having their inner extremities spaced apart, as at 54. Although the guide channel or chute 50 may be formed of metal or the like, it is preferred that the chute be formed as an extrusion of polyethylene or similar thermoplastic material which is self lubricating.

The chute 50 serves the function of conveying nuts from the stripping chamber to their point of ultimate utilization, and it will be noted that that portion of the chute projecting into the stripping chamber and underlying the cover plate 35 and the flange 47 has the upper legs 53 thereof removed (FIGURE 4). Further, it will be noted from FIGURE 3 that the level of the cover plate inner surface 39 and the inner surface 48 of the bracket 45 is substantially the same as the level of the upper edges of the guide legs 52.

Due to this dimensional relationship, it is possible for the nuts 20 and the web 21 to be fed into the stripping chamber through the upwardly and outwardly divergent mouth defined by the inclined surface 33 of the flange portion 31 to receive the nuts and web therein, the nuts being oriented on the web 21 so that the web contacts the undersurface 39 of the cover plate 35. The nuts are stripped from the web 21 by deflecting the web 21 through the gap intermediate the end surface 44 of the cover plate 35 and the upper edge of the bracket plate 47.

The web portion 21 so deflected is removed from the previously adherent nuts 20 and is wrapped about a take-up or tensioning reel 60 co-rotatable with a shaft 61 having its axis parallel to the axis of the reel shaft 13. This shaft 61 and the co-rotatable reel 60 project through the main support plate 11 (FIGURE 1) and are journaled for rotation in an embossure 62 formed in the plate 11. On the reverse side of the plate 11, the shaft has pivotally mounted thereon an actuating arm 64, this arm adjacent to and rotatable relative to a ratchet gear 65 provided with peripheral teeth 66. The gear teeth 66 are engaged by an arcuate, spring steel locking tongue 67 carried by a mounting plate 68 secured to the plate 11 by suitable means, as by cap screws 69. The purpose of this tongue 67 is to prevent clockwise rotation (when viewed as in FIGURE 1) of the ratchet gear 65. Mounted on the arm 64 is an actuating tang 70 also engageable with the teeth 66 and carried by plate 71 secured to the arm 64 for pivotal movement therewith, as by a mounting block 72 and screws 73.

Projecting laterally from the arm 64 is an actuating roller 75, and also carried by the arm 64 is a bracket 76 having a laterally deflected arm 77 secured by suitable means, as by link 78, to a vertically reciprocating part of the press. The upper extremity of the bracket 76 is provided with an aperture 79 receiving the lower hooked end of a coiled tension return spring 80 having its upper end secured to a bolt 81 or the like carried by an upper bracket 82 mounted on the main frame element 11.

The operation of the structure illustrated in FIGURE 1 of the drawings will be readily appreciated, inasmuch as actuation of the press will pull the actuating link 78 downwardly to move the arm 64 about the axis of the shaft 61 in a clockwise direction. Similar movement can be obtained by contacting the roller 75 with a movable part of the press to depress the arm 64. Such movement will allow the tang 70 to move over the next adjacent tooth 66 of the gear 65, the gear being held against rotation by the locking tongue 67. During press actuation, the spring 80 will be tensioned and, following actuation of the press, the spring 80 will return the arm 64 in a counter-clockwise direction to its illustrated position. Such counter-clockwise movement of the arm 64 will, through the tang 70, index the gear 65 in a counter-clockwise direction, thus indexing the shaft 61 in the same rotative direction.

Due to the angular reversal of FIGURES 1 and 2, the shaft 61 as viewed in FIGURE 2 will be indexed in a clockwise direction, thus tensioning the web 21 and pulling the web about the mandrel or reel 60. The reel 60 and the shaft 61 are maintained against free rotation by means of a coiled compression spring 83 and lock nuts 84.

Figure 6:
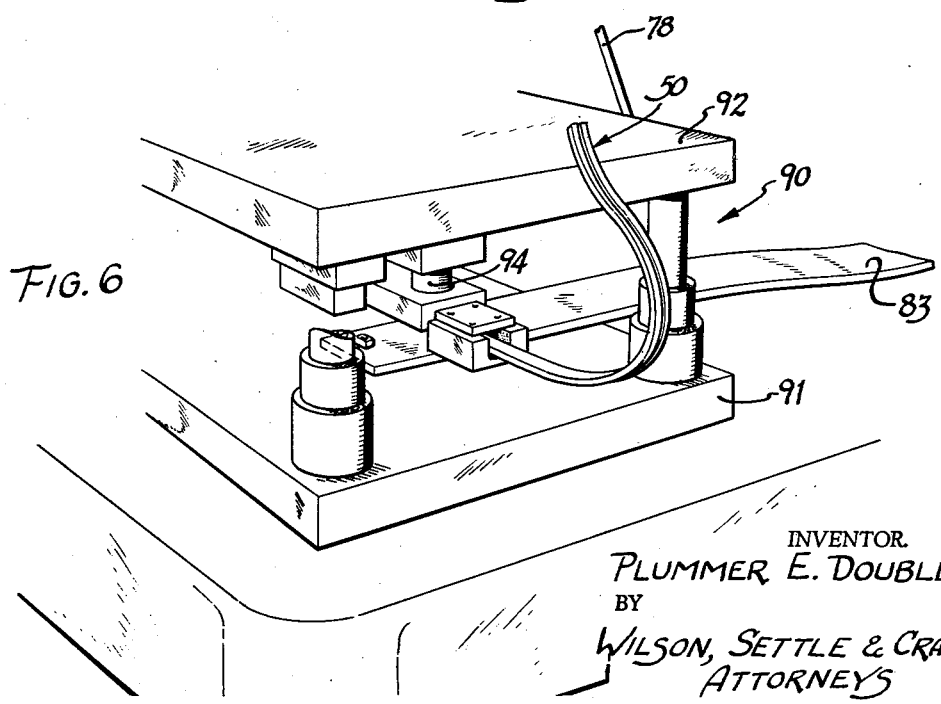
FIGURE 6 is a perspective elevational view illustrating a press in which nuts supplied by the apparatus of FIGURES 1–4 are utilized.

In FIGURE 6 of the drawings, a press 90 is illustrated for utilization in conjunction with the dispensing apparatus of this invention. This press includes a mold press bed 91 which is fixed and an upper vertically movable press element 92. A strip of sheet metal stock 93 is fed to the press for passage of a die button carried by the press bed 91 (not shown). Cooperating with the die button is an upper punch 94 carried by the movable press element 92. Nuts are conveyed into a position interposed between the die button and the punch 94 for the chute 50, the chute being maintained full of nuts by the hereinbefore disclosed dispensing apparatus 10. Secured to and movable vertically with the upper press element 92 is the actuating link 78 secured to the element 64. The installation of nuts in the press is carried out in a conventional manner, as fully disclosed in Patent No. 2,707,322.

Thus, due to the arrangement illustrated in FIGURES 1 and 2 of the drawings, each actuation of the press 90 will tension the web 21 through a predetermined increment of travel and will advance the nuts 20 within the stripping chamber. Tension in the web 21 advances each of the nuts to which the web is adhered and the first nut to which the web is adherent will advance each of the other nuts 20 within the guide chute 50. From FIGURE 5 of the drawings, it will be seen that the guide chute 50 is maintained in position by means of a locking pin 85 projecting through the embossure 46.

I claim:
1. In a device for storing and sequentially advancing nuts to a die assembly disposed in a reciprocating press, the device including a frame, a pair of spaced shafts carried by said frame, one of said shafts supporting thereon a helical coil of nuts adhered in spaced array to an elongated web and the second of said shafts having a wind-up reel thereon, means for removing nuts from the web and advancing the nuts toward the die assembly, comprising a nut-delivery chute of generally rectangular configuration peripherally confining nuts therein for sequential advancement to said die assembly, an initial portion of said chute being of U-shaped configuration with one open side, a movable plate overlying the open side of said initial chute portion to snugly confine therein a reach of the nut-web assembly intermediate said shafts, means cooperable with said plate to define therebetween an aperture through which the web only projects to said take-up reel, means for rotating said reel in response to reciprocation of said press, the rotation of said reel tensioning the assembly reach to move the assembly through the initial portion of said chute and beneath said plate toward said die assembly, the tensioning of said web advancing into and through the chute nuts previously stripped from said web.

2. In a device for storing and sequentially advancing nuts to a die assembly disposed in a reciprocating press, including a frame, a pair of spaced shafts carried by said frame, one of said shafts supporting thereon a helical coil of nuts adhered in spaced array to an elongated web and the second of said shafts having a wind-up reel thereon, the improvements of means defining an open-sided chamber, a nut delivery chute of generally rectangular cross-section and adapted to receive snugly therein said nuts, said chute having a delivery portion secured to the die assembly and an inlet portion confined in said chamber-defining means, the inlet portion of said chute having one side thereof removed in registry with the open side of said chamber, a stripping plate secured to said frame and overlying the open side of said chute inlet portion to receive against the underside thereof the web having said nuts adhered thereto, an opening in said plate through which the web only projects to said take-up reel, rotation of said take-up reel tensioning said web to advance the web and nuts adherent thereto into and through said inlet portion of said chute, the advancement of said web advancing nuts stripped from said web into and through the remainder of said chute to the delivery end thereof.

References Cited in the file of this patent
UNITED STATES PATENTS

| | | |
|---|---|---|
| 1,313,941 | Elliott | Aug. 26, 1919 |
| 2,856,185 | Whipple | Oct. 14, 1958 |
| 2,908,909 | Stolecki et al. | Oct. 20, 1959 |